United States Patent
Berry

(10) Patent No.: US 7,625,270 B2
(45) Date of Patent: Dec. 1, 2009

(54) MACHINE FOR REMOVING SKIN AND AMMONIA BURN FROM POULTRY

(76) Inventor: Allan Todd Berry, 6736 Cleveland Hwy., Clermont, GA (US) 30527

( * ) Notice: Subject to any disclaimer, the term of this patent is extended or adjusted under 35 U.S.C. 154(b) by 540 days.

(21) Appl. No.: 11/606,258

(22) Filed: Nov. 28, 2006

(65) Prior Publication Data

US 2008/0125024 A1   May 29, 2008

(51) Int. Cl.
*A22C 25/02* (2006.01)
(52) U.S. Cl. .................................................. 452/173
(58) Field of Classification Search ................ 452/173, 452/81, 114, 120, 123
See application file for complete search history.

(56) References Cited

U.S. PATENT DOCUMENTS

| | | | |
|---|---|---|---|
| 3,696,464 A * | 10/1972 | Dillon et al. | 452/167 |
| 3,755,854 A | 9/1973 | Mil | |
| 4,102,015 A | 7/1978 | Herrick | |
| 4,183,117 A | 1/1980 | Meyn | |
| 4,257,143 A * | 3/1981 | Lewis | 452/168 |
| 5,482,503 A | 1/1996 | Scott | |
| 5,605,503 A * | 2/1997 | Martin | 452/173 |
| 5,938,519 A * | 8/1999 | Wright | 452/173 |
| 6,099,399 A * | 8/2000 | Hearn et al. | 452/1 |
| 6,190,247 B1 * | 2/2001 | Reimer et al. | 452/1 |
| 6,283,848 B1 | 9/2001 | Berry | |
| 6,450,872 B1 * | 9/2002 | Haley et al. | 452/166 |
| 6,733,379 B2 | 5/2004 | Tsang | |

* cited by examiner

*Primary Examiner*—Thomas Price
(74) *Attorney, Agent, or Firm*—Joseph G. Mitchell, Esq.

(57) ABSTRACT

This is a machine for the removal of ammonia burns and skin from the paws of poultry. The machine does this by using two high speed brushes. The paws of poultry are positioned in between the two brushes by using a top guide bar, a bottom guide bar and an adjustable guide bar. The adjustable guide bar is uniquely designed to have a protrusion in approximately the middle of the adjustable guide bar that aids in the process of guiding the poultry paws within the bristles of the high speed brushes. The brushes then clean off the ammonia burns and take away the skin from the paws. This process occurs prior to cutting the paws off the poultry.

4 Claims, 6 Drawing Sheets

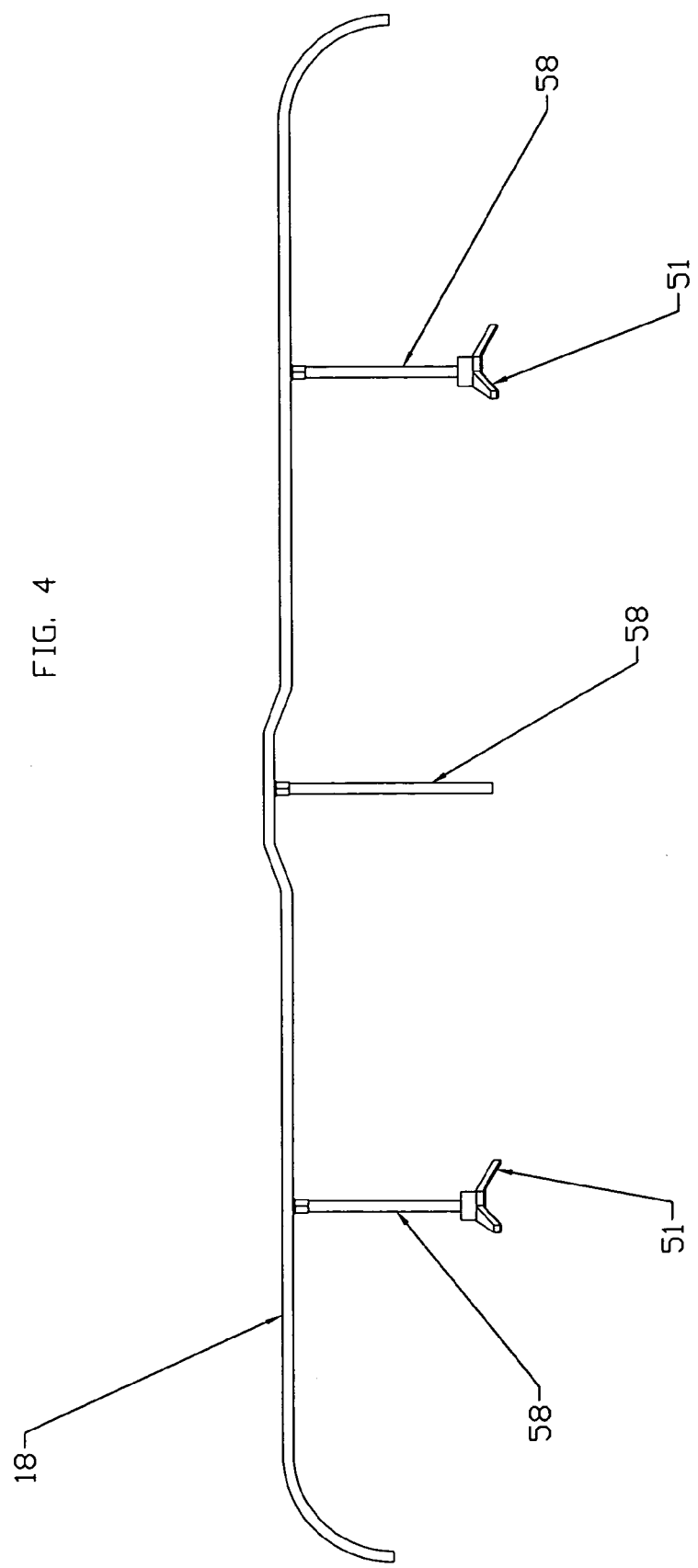

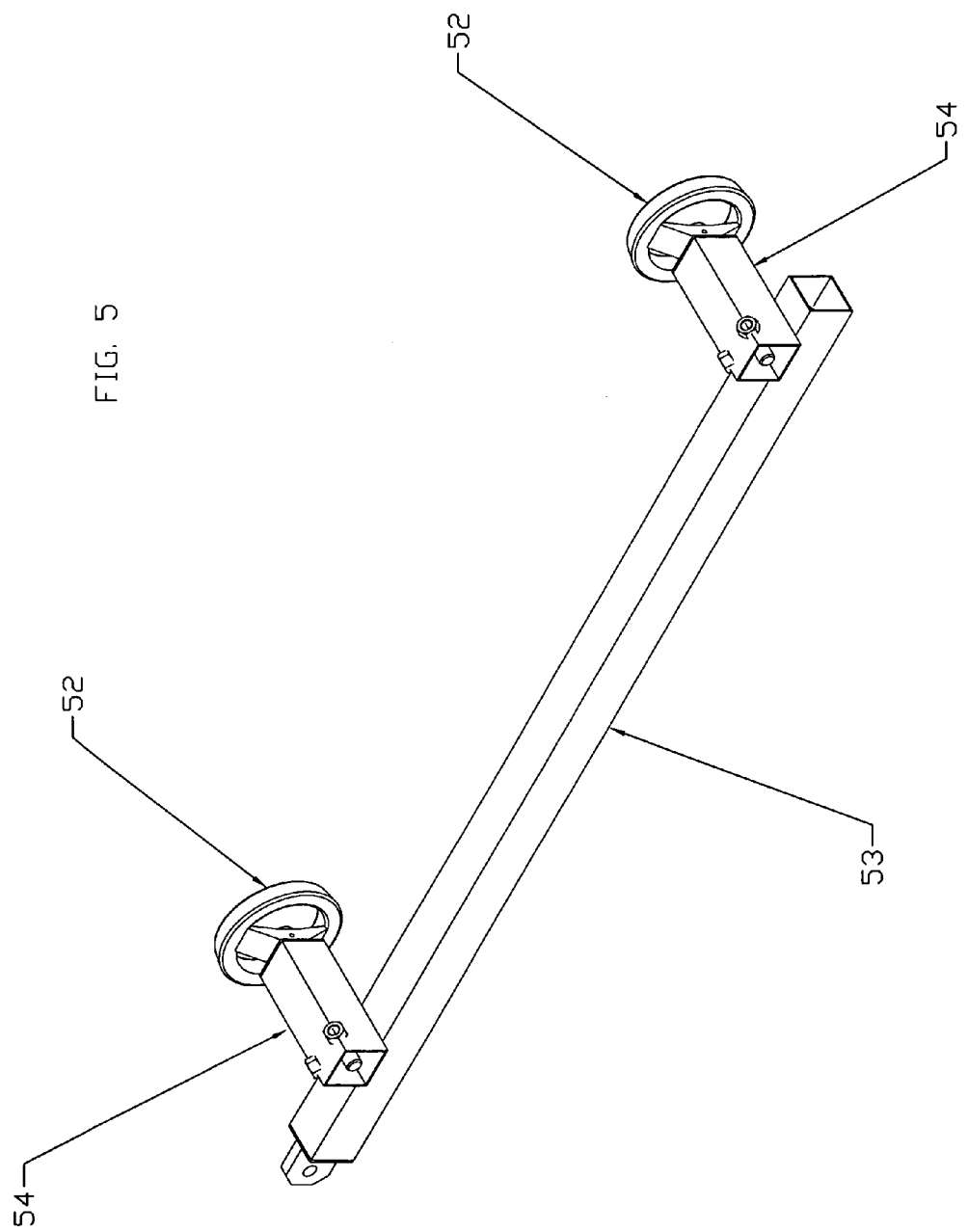

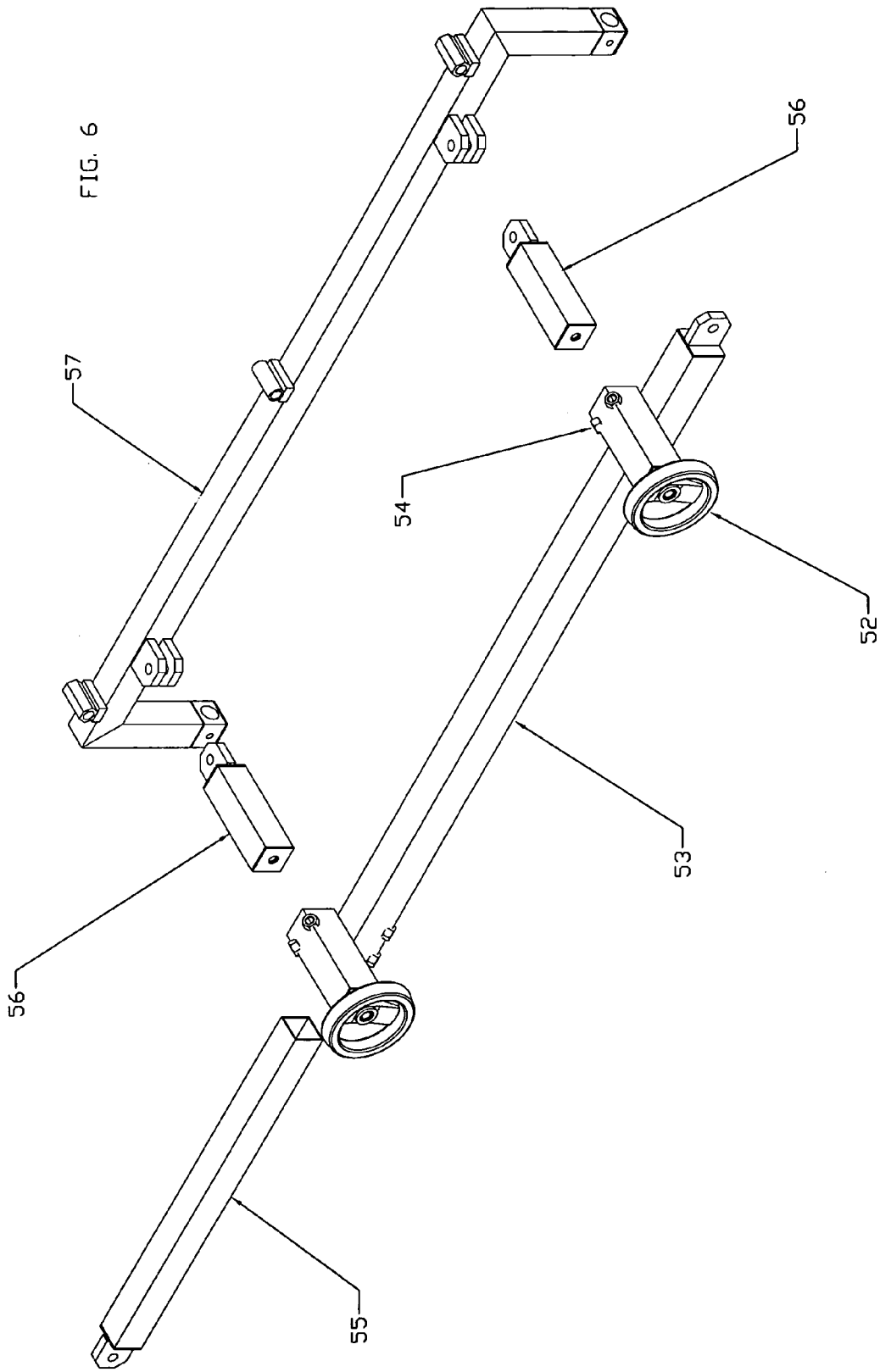

MACHINE FOR REMOVING SKIN AND AMMONIA BURN FROM POULTRY

BACKGROUND OF THE INVENTION

1) Field of the Invention

The field of invention relates generally to poultry processing and more particularly to the removal of the skin or cuticle and ammonia burns present on the poultry paw or foot.

2) Description of Prior Art

Poultry is suspended by its legs in a head lowermost position from shackles and moved sequentially through the poultry plant on the overhead conveyer for killing, scalding, and picking. The present invention is designed to clean the skin or cuticle and ammonia burns from the paws or feet of the poultry after the feathers have been removed from the carcass. The invention, unlike the prior art, does this prior to cutting off the paws. The present invention does this by use of high speed brushes and an adjustable guide bar that forces the paws between the brushes. The present invention will be further described herein.

The prior inventions do the cleaning of the paws of the poultry either after the paws are cut off from the body of the poultry or during the cut off process. Most of these inventions use a heating method and liquids to clean the poultry. The drawback to these methods is that the cleaning solutions leave ammonia burns and are not as successful in removing the skin or cuticle from the paw as the present invention. Based on the inventors' studies, it has been determined that with the present invention, ammonia burns are removed at an 80% success rate, and with the present invention, the studies show, the skin removal, in comparison to the prior art, results in significant savings to the poultry plant owner.

SUMMARY OF THE INVENTION

The present invention is a machine to remove skin and ammonia burns from the paws of poultry. In a poultry plant, chickens are hung from shackles by their paws. Usually, the paws are cut from the chicken body and the paw's skin and ammonia burns is removed and cleaned from the paws by means of heat, liquid, brushes and chemicals. The problem is that this process is inefficient and results in many paws being discarded.

The present invention is extremely efficient and dependable and results in a very low requirement to discard paws. The present invention has a frame. The shackles (which are not part of the present invention), with poultry hanging there from, travel through the frame and between top and bottom guide bars which are mounted on the frame. The top and bottom guide bars help guide the poultry hanging from the shackles through the frame. An adjustable guide bar is present and is provided to be adjusted forward in the frame or back in the frame depending on the size of the poultry. In approximately the middle of the adjustable guide bar, the adjustable guide bar protrudes approximately one inch outward and toward, if you will, the front of the frame and such protrusion is about six inches wide. This protrusion is a key feature to the overall invention's effectiveness.

Within the frame are mounted two brushes. The brushes vary in length (depending on the size of the frame) but are approximately four and half inches in diameter, and there are numerous bristles that stick out. Each bristle is about 0.120 of an inch in diameter. The invention provides a method to allow the brushes to be turned at a high rate of speed and for best results, it has been determined that the brushes should rotate at a speed of approximately 450 revolutions per minute. The height of the brushes can be adjusted up or down within the frame based on the size of the poultry traveling there through.

The initial set up of the invention is important. The brushes need to be adjusted so that they are level. The middle of the two brushes (that is the bottom of the top brush and top of the bottom brush) should be positioned about two inches above the bottom of the picking shackle. The top guide bar should be positioned about one inch over the vertical plane of the brushes so as to prevent contact with the brushes and the shackles. The adjustable guide bar should be level and about four inches above the bottom of the picking shackle. The adjustable guide bar should be positioned horizontally so that there is approximately a one inch opening between it and the top guide bar. The bottom guide bar should be level and placed along the center of the bird's breast as it enters and exits the machine. It should be placed in a position so that it lifts the bird to an approximate thirty (30) degree angle to position the paws in a horizontal plane. This will allow for a more thorough removal of the ammonia burn and skin of the paw. It will also prevent the bird from becoming entangled in the brushes.

These adjustments are for initial set-up only. Further adjustments may be required in order to achieve optimum performance depending on each individual operation due to various differences of each poultry plant and bird flock. Initial set-up and start up of the machine are very important to insure the best results.

The present invention, then, is described in its general terms and will be described in more detail, along with the drawings, later herein. The present invention aids in the removal of both ammonia burn and skin from the chicken paw. In operation, as the bird enters the machine's frame and along the top and bottom guide bars, the bird is raised to an approximate thirty (30) degree angle, as measured vertically, and projects forwardly within the subject invention's frame. This positions the paw on a horizontal plane and prevents the bird from becoming entangled in the brushes. The nail end of the paw is pulled in between the two brushes which are rotating in opposite motion. The paw then comes in contact with the bristles of the brushes to the point of approximately one to two inches from the hock of the bird. One of the key features of the invention that really makes it truly unique is the adjustable guide bar. As the paw travels along this horizontal plane of the machine, the adjustable guide bar, due to the unique design, described earlier, at adjustable guide bar's midpoint (the approximate one inch outward and about six inch wide design) causes the paw to be drawn away from the brushes at approximately the midpoint of the rotating brushes and then back into the rotating brushes to aid in the removal of the skin and ammonia burns at the nail of the paw. The paw then continues to be scrubbed by the brushes as the paw is fully seated within said brushes until it exits the machine.

The invention resides not in any one of these features per se, but rather in the particular combination of all of them herein disclosed and claimed, and it is distinguished from the prior art in this particular combination of all its structures for the functions specified.

There has thus been outlined, rather broadly, the important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved machine to clean the skin and ammonia burns from poultry paws.

It is therefore an object of the present invention to provide a new and improved machine at a reasonable low cost.

It is therefore an object of the present invention to provide a new and improved machine that has less stations so as to reduce the process length.

It is therefore an object of the present invention to provide a new and improved machine that saves more paws than the prior art.

Another object is to provide a new and improved machine that can easily be integrated into existing poultry processing lines to operate cooperatively therewith.

Another object is to provide a new and improved machine that operates rapidly and automatically.

Further objects and advantages are to provide improved elements and arrangements thereof in an apparatus for the purposes described which are dependable, economical, durable and fully effective in accomplishing its intended purposes.

These together with other objects of the invention, along with the various features of novelty that characterize the invention, are pointed out with particularity in the claims annexed to and forming a part of this disclosure. For a better understanding of the invention, its operating advantages and the specific objects attained by its use, reference should be had to accompanying drawings and descriptive matter that is illustrated the preferred embodiment of the invention.

BRIEF DESCRIPTION OF THE DRAWINGS

The invention will be better understood based on the following detailed description. Such description makes reference to the annexed drawings wherein:

FIG. 4 shows the adjustable guide bar of the subject invention.

FIG. 5 shows the slide frame and hand wheels of the subject invention.

FIG. 6 shows the brush frame of the subject invention.

DESCRIPTION OF PREFERRED EMBODIMENT

Figure 1:
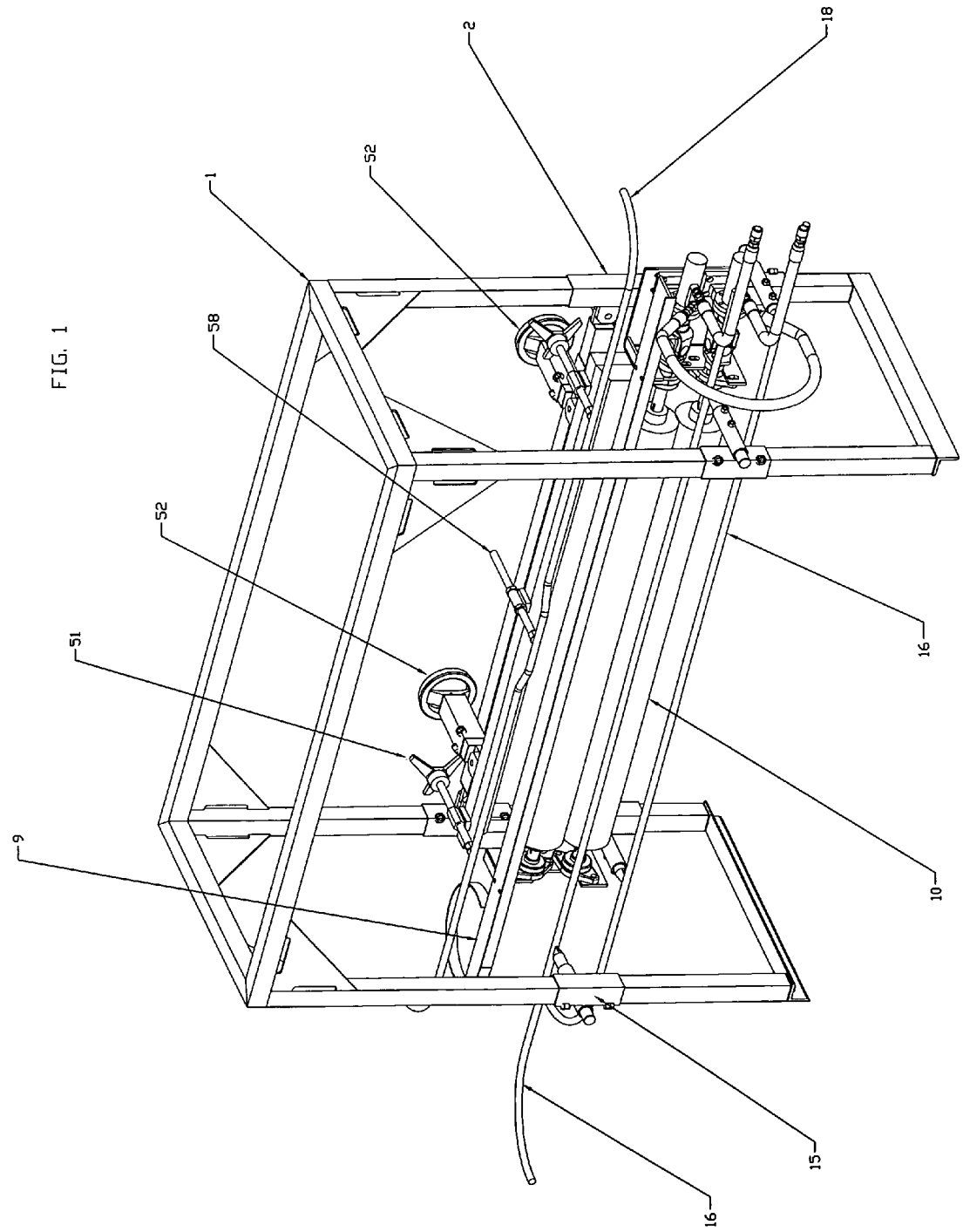
FIG. 1 shows a front right hand view of the invention.

With reference now to the drawings, and in particular FIGS. 1, 2, 5 and 6, Applicant's invention comprises a frame 1 and attached to said frame 1 is a guide bar frame 15. With said guide bar frame 15 there is mounted a bottom guide bar 16. Attached to the frame 1 is a top guide bar 9. A slide 2 is provided for mounting the brush frame 57 to the frame 1. Two brushes 10 are mounted to the brush mount frame 57 by means of an idler plate 5 and flange bearing 17 on one side and a flange bearing 17, coupling device 7 and mount plate 4 on the other side of said brushes 10.

With respect to FIGS. 1, 5, and 6, mounted to the brush frame 57 is a slide frame 53. This is done using a first slide adjustment 54 and a third slide adjustment 56. A second slide adjustment 55 attaches to the slide frame 53 so as to provide a method to attach each end of the slide frame 53 to the slide 2 for mounting the brush frame 57. Attached to the slide frame 53 are hand wheels 52. The hand wheels 52 when turned cause the brushes 10 to be moved up or down via the slide 2 for the brush mount to slide up or down the frame 1.

With respect to FIGS. 1, 2, 4 and 6, an adjustable guide bar 18 is provided. The adjustable guide bar 18 has three rods 58 attached to it. To the two outer rods 58 are attached knobs 51 at there end. In about the middle of the adjustable guide bar 18 there exists, as can be seen clearly in FIG. 4, a protrusion approximately one inch outward and toward, the front of the frame 1 and such protrusion is about six inches wide. This protrusion is a key feature to the overall invention's effectiveness. The rods 58 are placed in the openings provided in the brush frame 57. A hex nut 19 provides for a snug attachment. Turning the knobs 51 cause the adjustable guide bar 18 to move forward or back within the frame 1.

Figure 2:
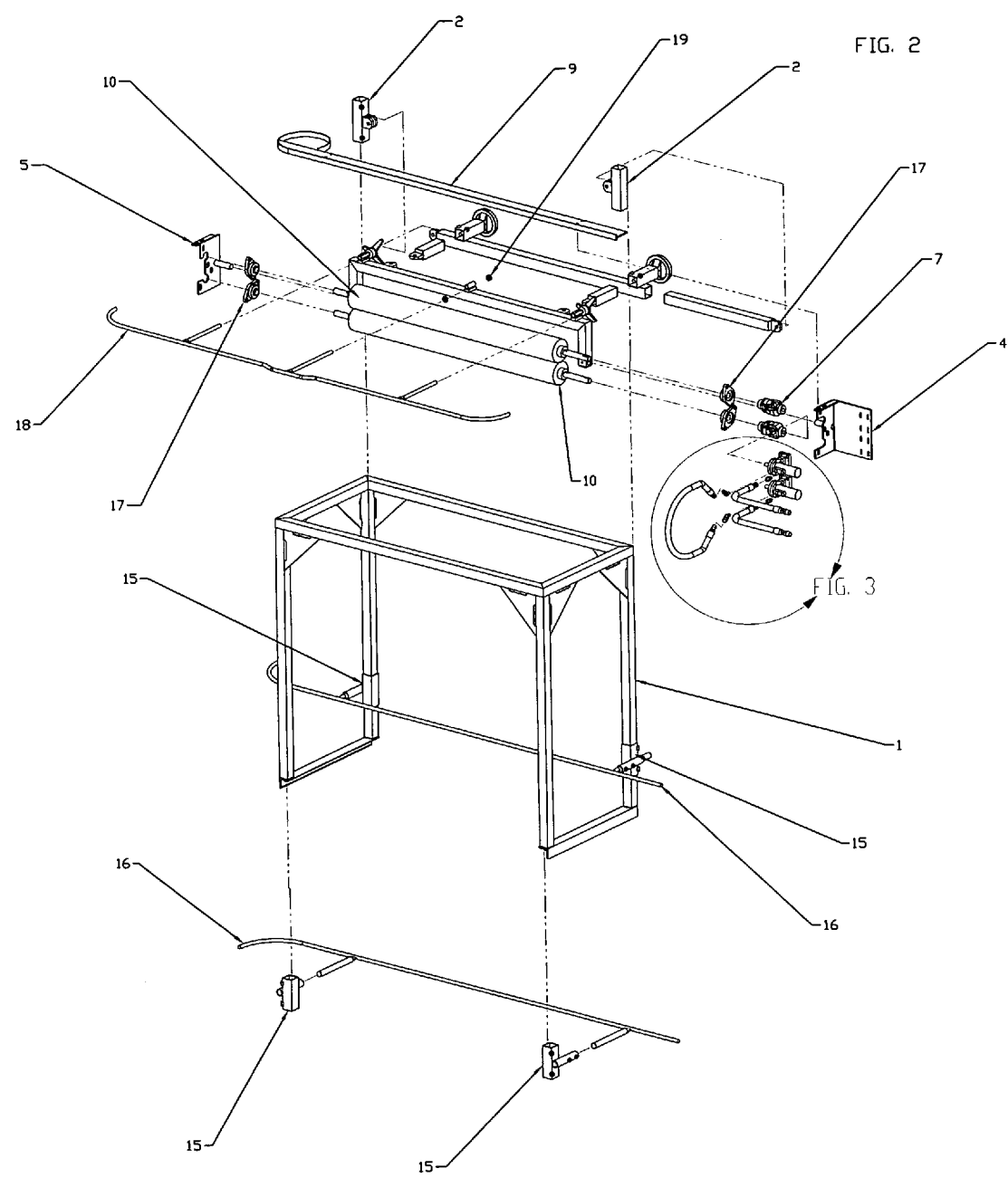
FIG. 2 shows an exploded view of the invention.
Figure 3:
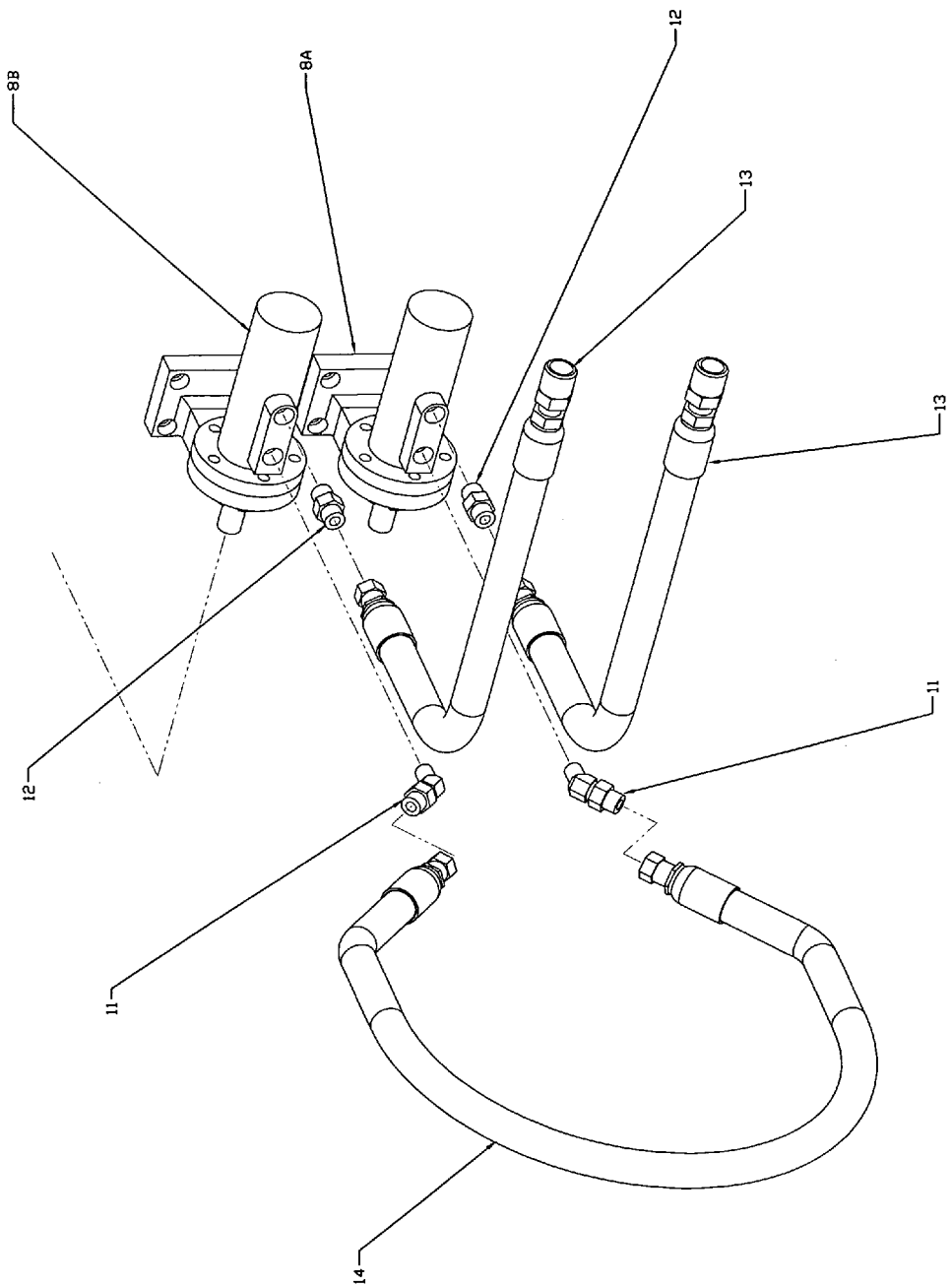
FIG. 3 shows the motor mount and hose assembly of the subject invention.

With respect to FIGS. 2 and 3, a motor mount 8A and brush motor mount 8B are attached to the mount plate 4. Attached to the motor mount 8A and brush motor mount 8B by means of a connector 12 are first hose assemblies 13. Attached to the motor mount 8A and brush motor mount 8B by means of a 45 degree connector 11 is a second hose assembly 14.

The initial set up of the invention is important. The brushes 10 need to be adjusted so that they are level. One does this using the hand wheels 52 and when turned, they cause the slides 2 (which the brush frame 57 is mounted to) to move up or down the frame 1. This in turn causes the brushes 10 to move up and down the frame 1. The middle of the two brushes 10 (that is the bottom of the top brush and top of the bottom brush) should be positioned about two inches above the bottom of the picking shackle. The top guide bar 9 should be positioned about one inch over the vertical plane of the brushes 10 so as to prevent contact with the brushes 10 and the shackles. The adjustable guide bar 18 should be level and about four inches above the bottom of the picking shackle. The adjustable guide bar 18 should be positioned horizontally so that there is approximately a one inch opening between it and the top guide bar 9. The bottom guide bar 16 should be level and placed along the center of the bird's breast as it enters and exits the frame 1. The bottom guide bar 16 should be placed in a position so that it lifts the bird to an approximate thirty (30) degree angle to position the paws in a horizontal plane. This will allow for a more thorough removal of the ammonia burn and skin of the paw. It will also prevent the bird from becoming entangled in the brushes 10.

Of course, these adjustments are for initial set-up only. Further adjustments may be required in order to achieve optimum performance depending on each individual operation due to various differences of each poultry plant and bird flock. Initial set-up and start up of the subject invention are very important to insure the best results.

In operation, as the bird enters the machine's frame 1 and along the top and bottom guide bars, 9 and 16 respectively, the bird is raised to an approximate thirty (30) degree angle, as measured vertically, and projects forwardly within the subject invention's frame 1. This positions the paw on a horizontal plane and prevents the bird from becoming entangled in the brushes 10. The nail end of the paw is pulled in between the two brushes 10 which are rotating in opposite motion. The paw then comes in contact with the bristles of the brushes 10 to the point of approximately one to two inches from the hock of the bird. One of the key features of the invention that really makes it truly unique is the adjustable guide bar 18. As the paw travels along this horizontal plane of the machine, the adjustable guide bar 18, due to the unique design, described earlier, at the midpoint (the approximate one inch outward and about six inch wide design) causes the paw to be drawn away from the brushes 10 at approximately the midpoint of the rotating brushes 10 and then back into the rotating brushes 10 to aid in the removal of the skin and ammonia burns at the nail of the paw. The paw then continues to be scrubbed by the brushes 10 as the paw is fully seated within said brushes 10 until it exits the frame 1 of the machine.

With respect to the above description then, it is to be realized that the optimum dimensional relationships for the invention to include variations in size, materials, shape, form, function and manner of operation, assembly and use, are deemed readily apparent and obvious to one skilled in the art, and all equivalent relationships to those skilled in the art, and all equivalent relationships to those illustrated in the drawings and described in the specification are intended to be encompassed by the present invention.

Thus, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A machine for removing skin and ammonia burn from poultry, comprising:
   a frame;
   at least two brushes mounted within said frame;
   an adjustable guide bar having at least one rod protruding from said adjustable guide bar and said adjustable guide bar, at approximately its middle, has a protrusion and the protrusion is approximately one inch out from its horizontal position and the protrusion is approximately six inches wide;
   a knob attached to at least one rod; and
   a means to adjust said brushes.

2. The machine of claim 1, further comprising:
   a top guide bar mounted on said frame;
   a bottom guide bar mounted on said frame; and
   a means to adjust said bottom guide bar.

3. A machine for removing skin and ammonia burn from poultry, comprising:
   a frame;
   at least two brushes mounted within said frame;
   an adjustable guide bar wherein said adjustable guide bar, at approximately its middle, has a protrusion and the protrusion is approximately one inch out from its horizontal position and the protrusion is approximately six inches wide;
   a means to adjust said adjustable guide bar;
   a top guide bar mounted on said frame;
   a bottom guide bar mounted on said frame
   a means to adjust said brushes, wherein said means to adjust said brushes, comprises a brush frame and at least one hand wheel; and
   a means to adjust said bottom guide bar, wherein said means to adjust said bottom guide bar is a guide bar frame.

4. A machine for removing skin and ammonia burn from poultry, comprising:
   a frame;
   at least two brushes mounted within said frame;
   an adjustable guide bar having at least one rod protruding from said adjustable guide bar, wherein said adjustable guide bar, at approximately its middle, has a protrusion and the protrusion is approximately one inch out from its horizontal position and the protrusion is approximately six inches wide;
   a knob attached to at least one rod;
   a top guide bar mounted on said frame;
   a bottom guide bar mounted on said frame;
   a means to adjust said brushes, wherein said means to adjust said brushes, comprises
   a brush frame and at least one hand wheel; and
   a means to adjust said bottom guide bar, wherein said means to adjust said bottom guide bar is a guide bar frame.

* * * * *